United States Patent
Riether

(10) Patent No.: US 10,232,461 B2
(45) Date of Patent: Mar. 19, 2019

(54) METHOD FOR PRODUCING A COMPOSITE COMPONENT

(71) Applicant: GM GLOBAL TECHNOLOGY OPERATIONS LLC, Detroit, MI (US)

(72) Inventor: Walter Riether, Nauheim (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 256 days.

(21) Appl. No.: 15/058,740

(22) Filed: Mar. 2, 2016

(65) Prior Publication Data

US 2016/0288243 A1    Oct. 6, 2016

(30) Foreign Application Priority Data

Mar. 4, 2015   (DE) .................. 10 2015 002 697

(51) Int. Cl.
   *B23K 10/00*    (2006.01)
   *B23K 11/16*    (2006.01)
   (Continued)

(52) U.S. Cl.
   CPC ............. *B23K 11/16* (2013.01); *B21J 15/025* (2013.01); *B23K 11/0066* (2013.01); *B23K 11/115* (2013.01); *B23K 11/14* (2013.01); *B23K 2101/006* (2018.08); *B23K 2101/18* (2018.08); *B23K 2101/185* (2018.08); *B23K 2103/04* (2018.08); *B23K 2103/172* (2018.08); *B23K 2103/18* (2018.08); *B29C 66/742* (2013.01); *B29K 2067/00* (2013.01);
   (Continued)

(58) Field of Classification Search
   CPC ... B23K 11/16; B23K 11/0066; B23K 11/115; B23K 11/15; B23K 2203/172; B23K 2201/006; B23K 2201/18; B29C 66/742; B29K 2067/00; B29K 2077/00; B29K 2705/02; B29K 2705/12; B29L 2031/3002
   USPC ........ 219/91.23, 91.2, 91.21, 137 R, 121.45, 219/121.46
   See application file for complete search history.

(56) References Cited

U.S. PATENT DOCUMENTS

| 6,294,751 | B1 | 9/2001 | Gall |
| 2013/0270229 | A1 | 10/2013 | Pederson et al. |
| 2016/0167158 | A1* | 6/2016 | Spinella ............. B23K 11/3009 403/270 |

FOREIGN PATENT DOCUMENTS

| DE | 102011052110 A1 | 1/2013 |
| DE | 102012015391 A1 | 3/2013 |

(Continued)

OTHER PUBLICATIONS

German Patent Office, German Search Report for German Application No. 102015002697.6 dated Feb. 11, 2016.

(Continued)

*Primary Examiner* — Mark H Paschall
(74) *Attorney, Agent, or Firm* — Lorenz & Kopf, LLP

(57) ABSTRACT

A method for producing a composite component includes providing a first component with a plastic layer, providing a second component which is formed at least partially from metal, and connecting the first component to the second component to form the composite component. At least one connecting element made of metal is positively connected to the first component and electrical resistance welding to the second component so that between the connecting element and the second component a welded connection is produced.

18 Claims, 7 Drawing Sheets

(51) Int. Cl.
*B23K 11/00* (2006.01)
*B23K 11/11* (2006.01)
*B23K 11/14* (2006.01)
*B21J 15/02* (2006.01)
B23K 101/00 (2006.01)
B23K 101/18 (2006.01)
B23K 103/16 (2006.01)
B29C 65/00 (2006.01)
B29K 67/00 (2006.01)
B29K 77/00 (2006.01)
B29K 705/02 (2006.01)
B29K 705/12 (2006.01)
B29L 31/30 (2006.01)
B23K 103/04 (2006.01)
B23K 103/18 (2006.01)

(52) U.S. Cl.
CPC ...... *B29K 2077/00* (2013.01); *B29K 2705/02* (2013.01); *B29K 2705/12* (2013.01); *B29L 2031/3002* (2013.01)

(56) References Cited

FOREIGN PATENT DOCUMENTS

| | | |
|---|---|---|
| DE | 102012013589 A1 | 1/2014 |
| DE | 102012013325 A1 | 10/2014 |
| EP | 2722124 A1 | 4/2014 |

OTHER PUBLICATIONS

Great Britain Patent Office, Great Britain Search Report for Great Britain Application No. 1522360.5, dated Jun. 22, 2016.

\* cited by examiner

METHOD FOR PRODUCING A COMPOSITE COMPONENT

CROSS-REFERENCE TO RELATED APPLICATION

This application claims priority to German Patent Application No. 102015002697.6, filed Mar. 4, 2015, which is incorporated herein by reference in its entirety.

TECHNICAL FIELD

The present disclosure pertains to a method for producing a composite component and to a method for producing a motor vehicle having a composite component.

BACKGROUND

Motor vehicles such as passenger cars include a body and a drive motor. The body as load-bearing component requires high stiffness. Besides pure steel sheets, composite components with a sandwich component as first component and a second component of metal are partly employed as parts of the body. Composite components include two outer metal sheets, in general steel sheets, between which a plastic layer is arranged. Composite components have the advantage of a lower weight than pure steel sheets. For adequate stiffness of the composite component it is required to punctiformly connect the first and second component to one another in local connecting regions.

SUMMARY

The present disclosure provides a method for producing a composite component and a method for producing a motor vehicle having a composite component, with which a connection between a first component with a plastic layer and a second component made of metal can be reliably produced with little technical effort. In particular, a method for producing a composite component is disclosed in a sandwich structure is formed by providing a first component with aplastic layer, providing a second component, which is at least partly formed from metal, and connecting the first component to the second component to form the composite component. At least one metal connecting element is positively connected to the first component and connected to the second component by electrical resistance welding so that between the connecting element and the second component, which are made of metal, produce a welded connection. Preferably, a composite component includes a first component and a second component at least partly of a different material and a component includes aplastic layer, in particular the first and second components are each formed as a layer. A metal sheet is considered as a metal layer.

In a complementary version, the first component is provided such that the first component is a composite component with a first metal sheet, preferably a second metal sheet and aplastic layer and the plastic layer is preferably arranged between the two metal sheets and/or multiple connecting elements made of metal are be positively connected to the first component and the connecting elements, which through electrical resistance welding, are connected to the second component so that between the connecting elements and the second component welded connections are produced. The resistance welding can be embodied easily and reliably.

In a further embodiment, the connecting elements may be rivets with a head and a shank. The rivets are positively connected to the first component by the head.

In a complementary version, connecting elements made of metal are positively connected to the first component in that the connecting elements are punched or introduced into the first component using a punching tool. Connecting the connecting elements to the first component is thus particularly reliable with low costs.

Practically, before punching the connecting elements into punching-in locations of the first component at the punching-in locations of the first component, bores are formed and in the bores, the connecting elements are punched in or introduced. During the punching-in or introducing of the connecting elements with the connecting elements, the first component is deformed, in particular with the head end of a rivet so that a first metal sheet of the composite component is deformed. With a drill, the bores or at least one bore can be formed prior to introducing or punching-in the connecting parts, for example in the case that introducing or punching-in the connecting elements into the first component is not possible because of the material of the first component.

In a further version, after the punching-in or inserting of the connecting elements into the first component, first end sections of the connecting elements form protrusions with respect to a first outside of the first component and/or following the punching-in or inserting of the connecting elements into the first component, second end sections of the connecting elements form protrusions with respect to a second outside of the first component. Additionally or alternatively, after the punching-in or inserting of the connecting elements into the composite component, the first and second metal sheet are positively connected to the connecting element perpendicularly to a longitudinal axis of the connecting element, so that mutual shifting of the two metal sheets in directions perpendicularly to the longitudinal axis of the connecting elements is blocked.

In a further embodiment, second end sections of the connecting elements are brought into contact with the second component in local contact locations of the second component and following this, the connecting elements which are brought into contact with the second component are connected at the local contact locations to the second component with the electrical resistance welding, in particular resistance spot welding. Additionally or alternatively, following the punching-in or introducing of the connecting elements in the composite component and following establishing the welded connections, the second metal sheet is fixed between the plastic layer and the second component and the first metal sheet is positively fastened at the connecting elements and the plastic layer is fixed between the first and second metal sheet, so that the first and second metal sheet, the plastic layer and the second component are connected to one another.

In a further configuration, for producing a welded connection, a first electrode is placed onto a first end section of a connecting element and a second electrode is placed onto the second component and subsequently a current is conducted through the first and second electrode, through the connecting element and through the second component. Because of the conducting of current and the heating resulting from this the components to be welded together can be welded to one another.

In aversion, for producing a welded connection each, the connecting element is placed onto a first outside of the second component and the second component includes a first outside and a second outside and the first outside is arranged located opposite the second outside and the second electrode is placed on the second outside of the second component.

In a further embodiment, during the establishment of a welded connection a compressive force is applied from the first electrode to the first end section of the connecting element and from the second electrode to the second component, so that the connecting element is subjected to a compressive force in longitudinal direction so that the extension of the connecting element in the longitudinal direction is reduced and the extension of the connecting element perpendicularly to the longitudinal direction is increased.

In an additional configuration, during the establishment of a welded connection, because of the increase of the extension of the connecting element perpendicularly to the longitudinal direction of the connecting element, the connecting element in each case is clamped into the first component under a preload in the direction perpendicularly to the longitudinal direction.

In a complementary configuration, the connecting elements are connected in a materially joined manner to the first metal sheet and preferably to the second metal sheet of the composite component because of an at least partial melting of the connecting elements during the electrical resistance welding. Because of the at least partial melting of the connecting elements made of metal, e.g. steel or aluminum, the melted metal during or after the cooling-down acts like an adhesive and sticks to the first and preferably second metal sheet in a materially joined manner.

In a further configuration, the punching-tool and the first and/or second electrode is actuated and/or moved with at least one robot for producing the welded connection and/or the composite component is provided with the first and/or second metal sheet made of steel or aluminum and/or the plastic layer made of polyester (PE) or polyamide (PA) and/or the second component is provided as metal sheet, preferably made of steel or aluminum.

Method according to the present disclosure for producing a motor vehicle with the steps: providing a first component with a plastic layer, providing a second component, this is formed at least partially and preferably completely from metal. Connecting the first component to the second component to form a composite component in sandwich structure, providing a drive motor, in particular an electric motor and/or internal combustion engine, providing wheels, connecting the composite component, the drive motor and the wheels to form the motor vehicle, wherein the composite component is produced with a method described in this patent application.

In a version, a part of the body of the motor vehicle or another component of the motor vehicle, for example an oil pan of an internal combustion engine is formed with the composite component. In a further version, the second component made of metal is a brace or a rod or an engine block.

In a further embodiment, a connecting element or multiple connecting elements made of metal is or will be or are positively connected to the first component in that at least one connecting element or multiple connecting elements during the production of the first component, for example during the injection molding is or are enclosed, for example over-molded by the material of the first component or at least one connecting element or multiple connecting elements is or are punched into the first component.

Practically, the composite component is provided such that the first and second metal sheets are connected to the plastic layer in a materially joined manner. In the case of larger composite components to be produced with a large surface it is generally necessary for adequate stiffness to connect the first and second component with multiple connecting elements and welded connections, for example more than 5, 10, 20 or 30 connecting elements and welded connections. In a complementary embodiment, the composite component is produced such that the sum of the areas of the welded connections of the composite component is substantially smaller than the area of the composite component, preferably smaller than 20%, 10%, 5%, 2% or 1% of the area of the composite component. The welded connections are thus punctiformly formed locally on a small part of the area of the composite component or of the metal sheets.

Practically, the connecting elements are punched in or introduced into the first component with a movement direction in the direction of the longitudinal axis of the connecting element or the longitudinal direction. The longitudinal direction is transverse to the longitudinal axis.

In a further embodiment, the at least one connecting element is connected to the second component by electrical resistance welding as projection welding so that between the at least one connecting element and the second component made of metal at least one welded connection is produced as projection welded connection. Practically, multiple connecting elements are connected to the second component by means of electrical resistance welding as projection welding so that between the connecting elements and the second component made of metal, welded connections as projection welded connections are produced.

The present disclosure, furthermore, includes a computer program with program code means, which are stored on a computer-readable data carrier in order to carry out a method described in this patent application, when the computer program is executed on a computer or a suitable computation unit. In addition, a computer program product with program code means which are stored on a computer readable data carrier in order to carry out a method described in this patent application when the computer program is executed on a computer or a suitable computation unit also forms part of the present disclosure.

BRIEF DESCRIPTION OF THE DRAWINGS

The present disclosure will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

Figure 1:
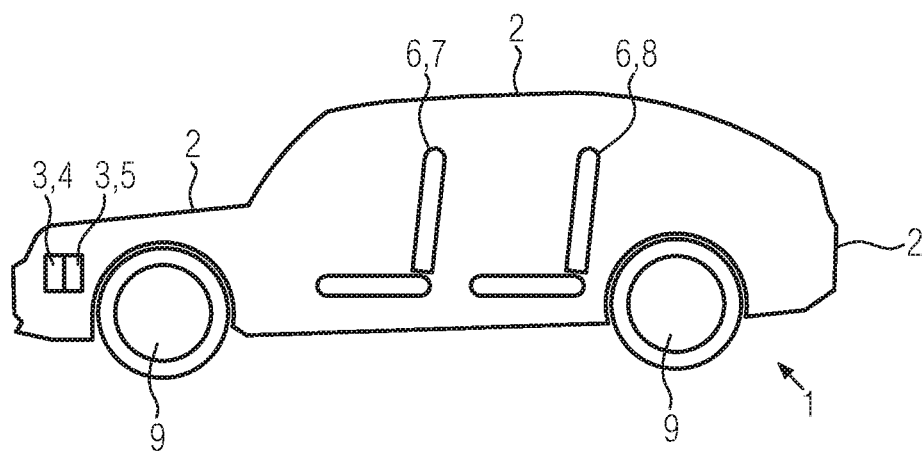
FIG. 1 shows a side view of a motor vehicle.

A motor vehicle 1 shown in FIG. 1 includes wheels 9, a body 2 made of steel sheets and of at least one composite component 10 having a sandwich structure, and an electric motor 4 and/or a combustion engine 5 is arranged as drive motor 3 within a motor compartment delimited by the body 2. A plurality of seats 6 are arranged within an interior space delimited by the body 2 to accommodate occupants. The seats 6 include two front seats 7 and three backseats 8. The backseats 8 in this case are combined to form a seat bench. In one embodiment, the roof section of the body 2 is formed from a composite component 10 and/or from a composite component 22.

Figure 2:
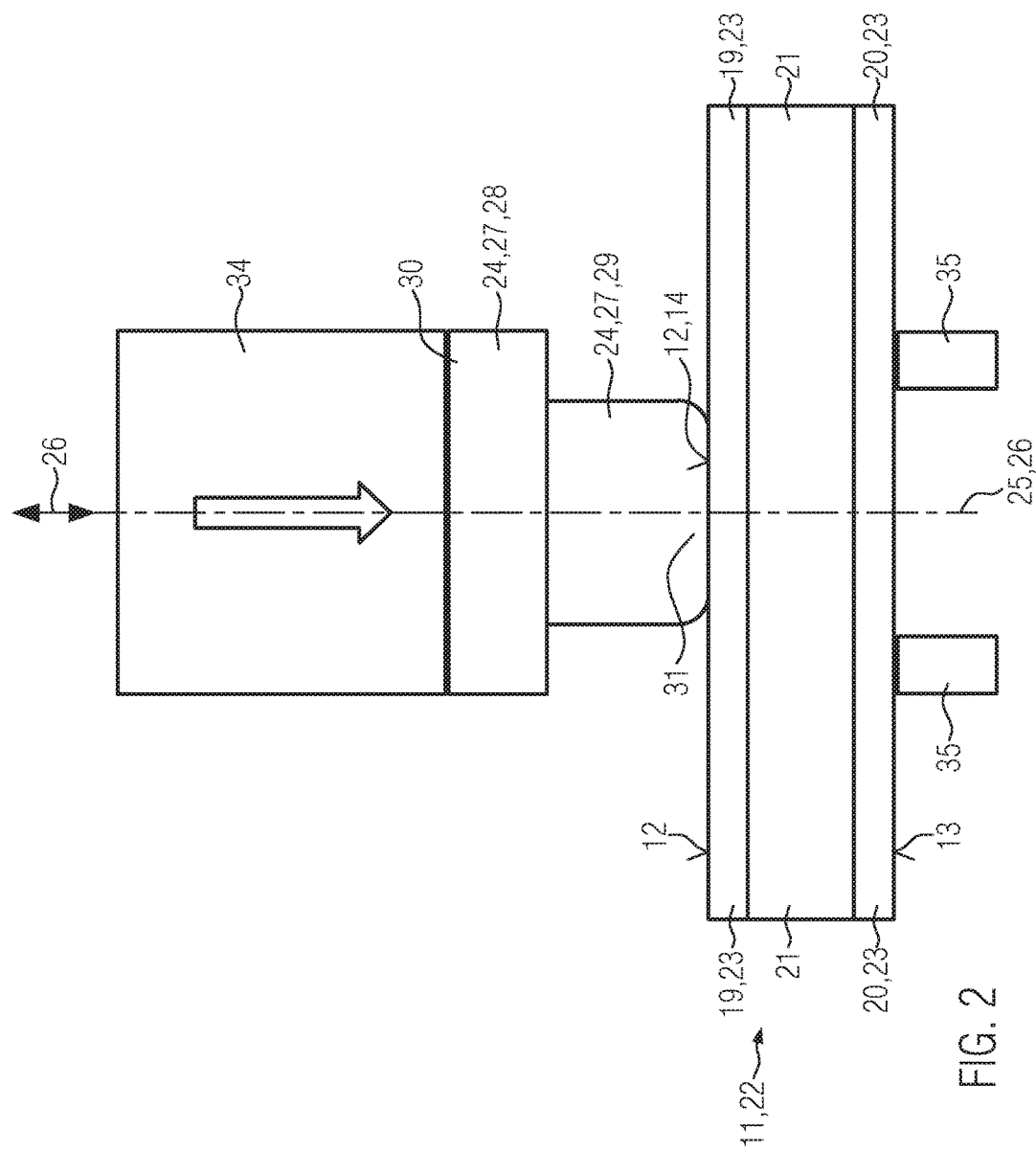
FIG. 2 shows a longitudinal section through a composite component, a rivet and a punching tool following the placing of the rivet onto the composite component and of the punching tool onto the rivet.

The body 2 of the motor vehicle 1 thus includes steel sheets, i.e. a sheet that exclusively consists of steel or steel sheets, and of the at least one composite component 22. The composite component 22 as a first component 11 includes a first metal sheet 19, a second metal sheet 20, preferably each made of steel, and a plastic layer 21, for example made of polyester (PE) or polyamide (PA). The two metal sheets 19, 20 as steel sheets 23 have a thickness between 0.2 and 0.4 mm and the plastic layer 21 has a thickness between 0.2 and 0.8 mm. During the production of the motor vehicle 1, a composite component 22 (FIG. 2) is initially provided, for example in that the composite component 22 is supplied by a supplier to a producer of the motor vehicle 1. In the case of the composite component 22 as the first component 11, the first and second metal sheet 10, 11 are connected to the plastic layer 21 in a materially joined manner only indirectly, i.e. there is no direct connection between the middle of the two metal sheets 19, 20. The first component 11 has a first outside 12 on the first metal sheet 19 and a second outside 13 on the second metal sheet 20. The two outsides 12, 13 are arranged on the component 11 located opposite one another. This connection is not adequate for using the composite component 22 in the body 2 of the motor vehicle 1. Furthermore, for producing the composite component 10 with sandwich structure, a second component 15 as a metal sheet 42 made of steel is provided. The second component 15 includes a first outside 16 and a second outside 17 and the two outsides 16, 17 are arranged on the second component 15 located opposite one another.

Figure 3:
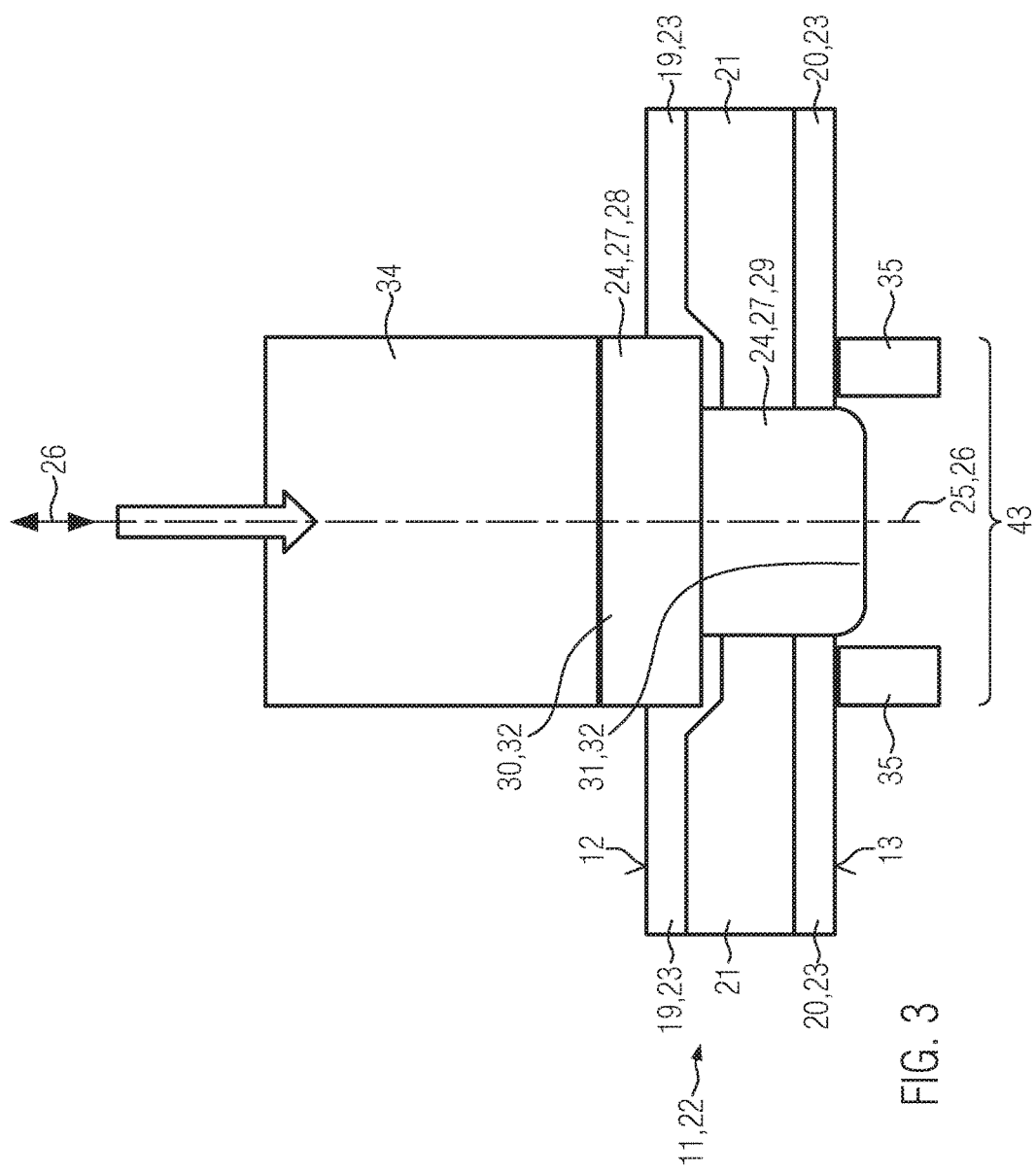
FIG. 3 shows a longitudinal section through the composite component, the rivet and the punching tool according to FIG. 2 following the punching-in of the rivet into the composite component.

For connecting the first component 11 to the second component 15, i.e. for producing the composite component 10, a rivet 27 as a connecting element 24 is placed onto a first outside 12 at a local punching-in location 14 on the first metal sheet 19 of the composite component and a retaining tool 35 is placed onto the second outside 13 of the composite component 22. The rivet 27 includes a head 28 and a shank 29 and the diameter, i.e. the extension of the rivet 27 perpendicularly to a longitudinal axis 25 of the rivet 27, of the rivet 27 is greater at the head 28 than at the shank 29. Following this, the rivet 27 is punched into the composite component 22 using a punching tool 34, so that a first upper end section 30 of the rivet 27 on the head 28 forms a protrusion 32 with respect to the first outside 12 and a second lower end section 31 of the rivet 27 on the shank 29 forms a protrusion 32 with respect to the second outside 13 of the composite component 22, i.e. the rivet 27 is not punched in flush with respect to the outsides 12, 13 since the length of the rivet 27 is greater than the thickness of the composite component 22 (FIG. 3). With the head 28, the rivet 27 deforms the first metal sheet 19 at a local connecting region 43 and because of the larger diameter of the head 28 compared with the shank 29, the composite component 22 is positively connected with the head 28 to the rivet 27 in a longitudinal direction 26 of the longitudinal axis 75.

In addition, the first and second metal sheet 19, 20 are positively connected to the connecting element 24 in directions perpendicularly to the longitudinal axis 25 of the connecting element 24, so that mutual shifting of the two metal sheets 19, 20 in directions perpendicularly to the longitudinal axis 25 of the connecting element 24 is blocked since the rivet 27 or the connecting element 24 in this movement direction forms a stop as positive connection in this movement direction.

Figure 4:
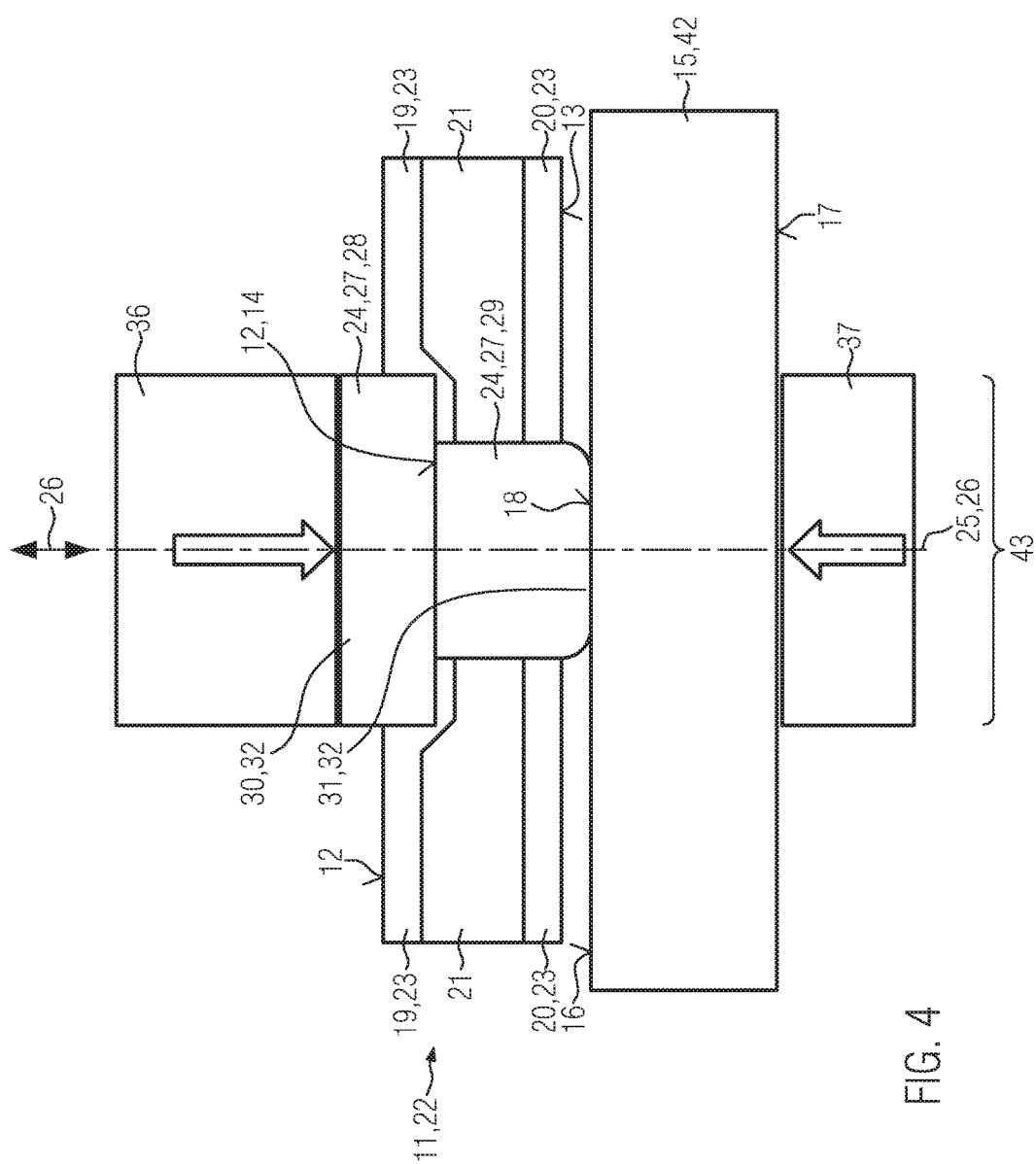
FIG. 4 shows a longitudinal section through the composite component with the punched-in rivet and a second component following the placing of a first electrode onto the rivet and a second electrode onto the second component.

Following the punching-in of the rivet 27 into the composite component 22, the second end section 31 of the rivet 27 is placed onto a local contact location 18 on the first outside 16 of the second component 15. Following or simultaneously with this, a first electrode 36 is placed onto the first end section 30 of the rivet 27 and a second electrode 37 onto the second outside 17 of the second component 15 (FIG. 4). The first electrode 36 can also be formed by the punching tool 34. Following this, an electric current is briefly conducted through the two electrodes 36, 37, the rivet 27 and the second component 15 so that by means of resistance spot welding at the local contact location 18 a local punctiform welded connection 33 is produced between the connecting element 24 formed of steel and the first outside 16 of the second component 15.

Figure 5:
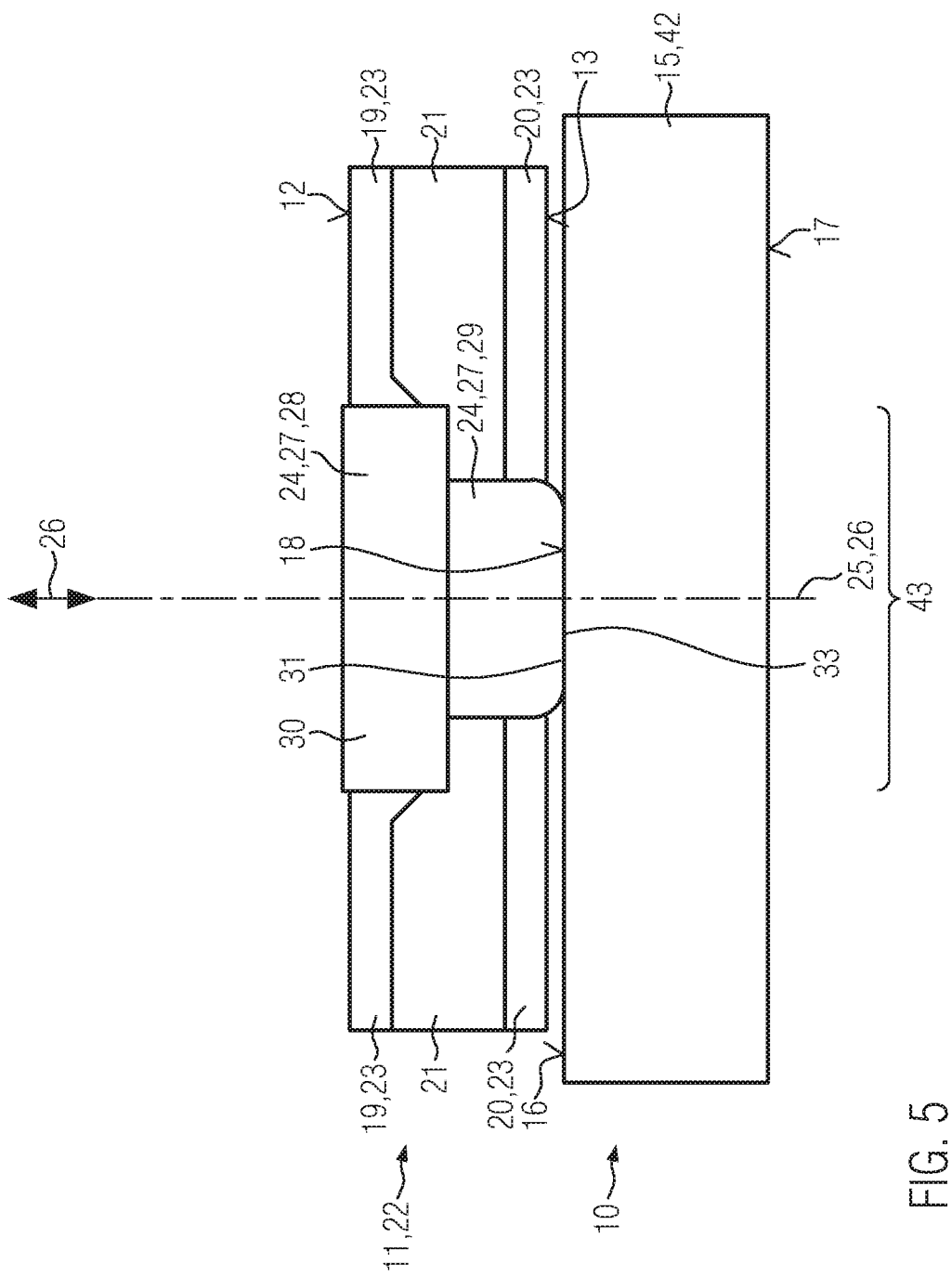
FIG. 5 shows a longitudinal section through the composite component with the punched-in rivet and the second component after the establishment of a spot welded connection between the rivet and the second component and upsetting the rivet in the direction of a longitudinal direction of the rivet.

During the production of the welded connection 33, a compressive force is applied from the first electrode 36 onto the first end section 30 of the connecting element 24 and from the second electrode 37 onto the second component 15 so that the connecting element 24 is subjected to a compressive force in longitudinal direction 26 so that the extension or length of the connecting element 24 in the longitudinal direction 26 is reduced and the extension or diameter of the connecting element 24 perpendicularly to the longitudinal direction 26 is enlarged (FIG. 5). Because of this, the rivet 27 is fastened clamped into the composite component 22 under a preload in the direction perpendicularly to the longitudinal direction 26 or the longitudinal axis 25 so that in addition there is anon-positive connection between the rivet 27 and the composite component 22. During the production of the welded connection 33 or the passing-through of electric current the rivet 27 melts slightly no that in addition a materially joined connection between the rivet 27 and the composite component 22 can be produced. The composite component 22 and the second component 15 as the metal sheet 42 have a major extension perpendicularly and parallel to the drawing plane of FIGS. 2 to 5 so that for a reliable connection by repeating the method steps described above a multitude of rivets 27 is punched into the composite component 22 and welded to the second component 15.

Because of this, the second metal sheet 20 is fixed between the plastic layer 21 and the second component 15 and the first metal sheet 19 with the head 28 is positively connected to the rivet 27 and the plastic layer 21 is fixed between the first and second metal sheet 19, 20 so that the first and second metal sheet 19, 20, the plastic layer 21 and the second component 15 are connected to one another to form the composite component 10. The first component 10 and preferably the second component 15 are each formed in a layered manner so that the composite component 10 has a sandwich structure.

Figure 7:
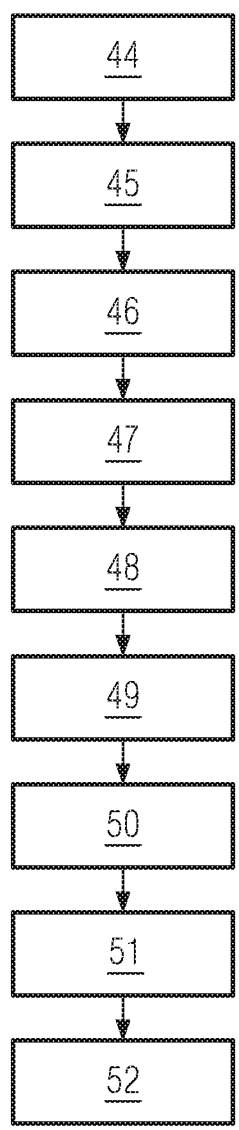
FIG. 7 shows a flow diagram of the method for producing a composite component.

FIG. 7 shows the method in a flow diagram. A first component 11 is provided at black 44 and a second component is provided at block 45. At block 46 the connecting element 24 is placed onto the first component 11, and the connecting element 24 is punched into the first component 11 at block 47. At block 48 the punched-in connecting element 24 is placed onto the second component 15, and the first electrode 36 is placed onto the connecting element 24 at block 49. At block 50 the second electrode 37 is placed onto the second component 15. At block 51, an electric current is conducted through the electrodes 36, 37, the connecting element 24 and the second component 15 so that a welded connection 33 is established between the connecting element 24 and the second component 15 at block 52.

Figure 6:
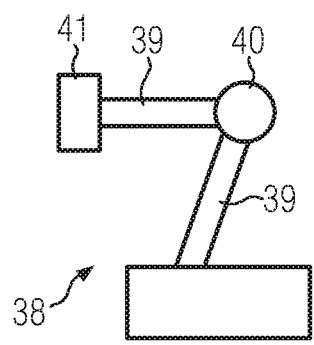
FIG. 6 shows a schematic representation of a robot.

A robot 38 as an industrial robot 38 as shown in FIG. 6 serves for actuating and moving the punching tool 34, the retaining tool 35 and the electrodes 36, 37. The robot 38 includes multiple robot arms 39 which are connected to one another in an articulated manner by means of at least one robot joint 40, so that the robot arms 39 are freely moveable in space. At the end of a last robot arm 39, an end effector 41 is arranged. The end effector 41 includes the punching tool 34, the retaining tool 35 and the electrodes 36, 37.

In a further exemplary embodiment, the first component 11 includes only a plastic layer 21 or only the first metal sheet 19 and the plastic layer. The method described above is analogously carried out for this exemplary embodiment.

Considered on the whole, substantial advantages are connected to the method for producing a composite component 10 according to the present disclosure. The connecting elements 24 serve both for connecting the two metal sheets 19, 20 of the composite component 22 and also for connecting the composite component 22 to the second component 15, so that with this production step a composite component 10 with sandwich structure can be produced in a simple manner and the composite component 10, because of the fixed connection among all components 19, 20, 21, 42 of the composite component 10 to the connecting elements 24, has adequate stiffness for use in a motor vehicle 1, for example in a body 2 of the motor vehicle 1.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A method for producing a composite component having a sandwich structure comprising:
providing a first component including a first plastic layer and a first metal layer that is materially joined to the first plastic layer;
providing a second component including a second metal layer;
inserting at least one metal connecting element into the first component and through the first metal layer and the first plastic layer, including deforming the first metal layer into the first plastic layer;
forming the composite component from the first and second components; and
welding the at least one connecting element to the second component to form a welded connection therebetween.

2. The method according to claim 1, further comprising providing the first component including the first metal layer, the first plastic layer, and a third metal layer, the first and third metal layers materially joined to the first plastic layer with the first plastic layer layered therebetween, and
wherein the third metal layer is layered on the second metal layer.

3. The method according to claim 2, further comprising welding the at least one metal connecting element to the first metal layer to form the welded connection.

4. The method according to claim 1, further comprising positively connecting a plurality of metal connecting elements to the first component, and welding each of the plurality of metal connecting elements to the second component to form a welded connection between each of the plurality of metal connecting elements and the second component.

5. The method according to claim 1, wherein the at least one connecting element comprises a rivet having a head and a shank each, and wherein deforming the first metal layer and compressing the first metal layer into the first plastic layer includes deforming the first metal layer into the first plastic layer with the head of the rivet.

6. The method according to claim 5, wherein inserting the at least one metal connecting element includes punching the rivet into the first component using a punching tool.

7. The method according to claim 6, further comprises forming at least one bore in the first component and inserting the rivet into the bore.

8. The method according to claim 6, wherein punching the rivet into the first component further comprises forming a protrusion with a shank of the rivet with respect to an outer surface the first component.

9. The method according to claim 6, wherein punching the rivet into the first component positively connects the first and second component in a direction transverse to a longitudinal axis of the rivet so that relative movement of the two metal sheets in the direction transverse to the longitudinal axis of the rivet is prevented.

10. The method according to claim 2, further comprising positioning a free end of the at least one connecting element into contact with the second component at a local contact location, and welding the free end to the second component so that the first and third metal sheets, the plastic layer and the second component are connected to one another.

11. The method according to claim 10, further comprising placing a first electrode onto the free end of the connecting element and a second electrode onto an end of the connecting element opposite the free end, and conducting a current through the first and second electrode, through the connecting element and through the second component to form the welded connection.

12. The method according to claim 11, wherein the second component defines a first surface and a second surface opposite the first surface, the method further comprising:
   positioning the connecting element into contact with the first surface;
   positioning the second electrode onto the second surface of the second component opposite a contact point where the connecting element is in contact with the first surface; and
   welding the connecting element to the second component at the contact point.

13. The method according to claim 11, further comprising applying a compressive force by the second electrode onto the end of the connecting element opposite the free end and by the first electrode onto the second component so that the connecting element is subjected to a compressive load in a longitudinal direction so that the extension of the connecting element is reduced in the longitudinal direction and the enlarged in a transverse direction relative to the longitudinal direction.

14. The method according to claim 13, further comprises clamping the connecting element onto the first component, wherein enlargement of the extension in the transverse direction generates a clamping force into the first component under a preload in the transverse direction.

15. The method according to claim 1, wherein the first plastic layer is selected from the group consisting of a polyester sheet or a polyamide sheet and the second metal layer is selected from the group consisting of a metal sheet, an aluminum sheet or a combination thereof.

16. The method according to claim 15, further comprising providing the first component including a first metal layer selected from group consisting of a metal sheet, an aluminum sheet or a combination thereof, wherein the first plastic layer is arranged between the first and second metal layers.

17. A method for producing a composite component having a sandwich structure comprising:
   providing a first component including a first metal layer, a second metal layer, and a plastic layer that is layered between and materially joined to the first and second metal layers;
   providing a second component including a third metal layer;
   providing a metal connecting element with a head and a shank;
   punching the shank of the metal connecting element through the first metal layer, the plastic layer, and the second metal layer, including deforming the first metal layer into the first plastic layer with the head of the metal connecting element; and
   welding the metal connecting element to the first and second components to form welded connections between the metal connecting element and the third metal layer and between the metal connecting element and the first metal layer.

18. The method of claim 17, further comprising welding the metal connecting element to the first and second components to form welded connections between the metal connecting element and the third metal layer, between the metal connecting element and the first metal layer, and between the metal connecting element and the second metal layer.

* * * * *